(12) United States Patent
Unno et al.

(10) Patent No.: US 9,470,283 B2
(45) Date of Patent: Oct. 18, 2016

(54) NON-ASBESTOS FRICTION MATERIAL COMPOSITION

(75) Inventors: Mitsuo Unno, Ibaraki (JP); Masamichi Mitsumoto, Ibaraki (JP); Kazuya Baba, Ibaraki (JP); Takashi Kikudome, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/124,382

(22) PCT Filed: Jun. 6, 2012

(86) PCT No.: PCT/JP2012/064587
§ 371 (c)(1),
(2), (4) Date: Feb. 18, 2014

(87) PCT Pub. No.: WO2012/169545
PCT Pub. Date: Dec. 13, 2012

(65) Prior Publication Data
US 2014/0202805 A1    Jul. 24, 2014

(30) Foreign Application Priority Data

Jun. 7, 2011  (JP) .................. 2011-127571
Jun. 7, 2011  (JP) .................. 2011-127574

(51) Int. Cl.
*F16D 69/00*     (2006.01)
*F16D 69/02*     (2006.01)

(52) U.S. Cl.
CPC ..... *F16D 69/026* (2013.01); *F16D 2200/0069* (2013.01); *F16D 2200/0073* (2013.01); *F16D 2200/0086* (2013.01)

(58) Field of Classification Search
CPC ................ F16D 69/026; F16D 2200/0069; F16D 2200/0073; F16D 2200/0086
USPC ..................... 188/251 A, 251 M
See application file for complete search history.

(56) References Cited

U.S. PATENT DOCUMENTS

| | | | |
|---|---|---|---|
| 6,432,187 B1 | 8/2002 | Ogawa et al. | |
| 2002/0033315 A1* | 3/2002 | Yamane | 192/107 M |
| 2003/0049427 A1 | 3/2003 | Tadokoro et al. | |
| 2004/0253173 A1 | 12/2004 | Ogawa et al. | |
| 2011/0297496 A1* | 12/2011 | Subramanian | 188/251 A |
| 2012/0070680 A1* | 3/2012 | Unno et al. | 428/549 |

FOREIGN PATENT DOCUMENTS

| | | |
|---|---|---|
| JP | 4-290621 A | 10/1992 |
| JP | 4-304284 A | 10/1992 |
| JP | 6-306185 A | 11/1994 |
| JP | 9-144792 A | 6/1997 |
| JP | 2000-38571 A | 2/2000 |
| JP | 2000-154371 A | 6/2000 |
| JP | 2000-230168 | 8/2000 |
| JP | 2000230168 A * | 8/2000 |
| JP | 2002-97285 A | 4/2002 |
| JP | 2002-97451 A1 | 4/2002 |
| JP | 2002-138273 A | 5/2002 |
| JP | 2002-266915 A | 9/2002 |
| JP | 2003-082331 | 3/2003 |
| JP | 2003-313312 A | 11/2003 |
| JP | 2004-169222 A | 6/2004 |
| JP | 2004-352738 A | 12/2004 |
| WO | 02/10069 A1 | 2/2002 |
| WO | 03/037797 A1 | 5/2003 |
| WO | 2008/123558 A1 | 10/2008 |
| WO | 2011/158917 A1 | 12/2011 |

OTHER PUBLICATIONS

JP Office Action of Appln. No. 2011-127571 dated Oct. 21, 2014.
JP Office Action of Appln. No. 2011-127574 dated Oct. 21, 2014.

* cited by examiner

*Primary Examiner* — Melanie Torres Williams
(74) *Attorney, Agent, or Firm* — Fitch, Even, Tabin & Flannery, LLP

(57) ABSTRACT

Provided by the present invention are: a non-asbestos frictional material composition containing a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt is contained therein with antimony trisulfide or zinc powders, with content of the titanate salt being in the range of 10 to 35% by mass; and a frictional material and a friction member that use the said non-asbestos frictional material composition.

10 Claims, No Drawings

NON-ASBESTOS FRICTION MATERIAL COMPOSITION

TECHNICAL FIELD

The present invention relates to a non-asbestos frictional material composition, and a frictional material and a friction member that use this composition.

Specifically, the present invention relates to a non-asbestos frictional material composition which is suitable for frictional materials such as a disc brake pad and a brake lining used to brake a car and the like, and which is environmentally benign due to a low copper content, excellent in abrasion resistance at high temperature, and low in generation of the metal catch. The present invention further relates to a frictional material and a friction member that use this non-asbestos frictional material composition.

BACKGROUND ART

Frictional materials such as a disc brake pad and a brake lining are used for braking a car and the like. These frictional materials play a role in the brake by frictioning the counter members such as a disc rotor and a brake drum. Therefore, for the frictional materials, not only high friction coefficient and stability of this friction coefficient are required, but also a prolonged pad life in the use of the brake in a wide temperature range from low to high temperature, that is, the abrasion resistance, is required.

When the brake is used in the high temperature range, a lump formed of metal abrasion powders, which is called a metal catch, is generated on surface of the frictional material, whereby sometimes causing a squeal of the brake as well as leading to increase in abrasion loss of the disc rotor and the frictional material. Accordingly, a proposal was made to blend a metal sulfide to suppress generation of the metal catch as well as to improve the abrasion resistance at high temperature (see the Patent Document 1).

On the other hand, a frictional material contains a binder, a fiber substrate, an inorganic filler, an organic filler, and so forth; and in order to express the above-mentioned characteristics, in general, these are respectively used solely or as a combination of two or more kinds of them. As to the fiber substrate, an organic fiber, a metal fiber, an inorganic fiber, and the like are used; and to improve the abrasion resistance, a copper fiber and a copper alloy fiber are used as the metal fiber. Furthermore, in the frictional material, a non-asbestos frictional material has become a main stream, in which a large amount of a copper, a copper alloy, and the like are used.

However, in the frictional material containing a copper and a copper alloy, the abrasion powders generated during braking contain a copper, suggesting possibility of causing pollution in a river, a lake, an ocean, and so forth; and therefore, a movement to control the use thereof is growing. Accordingly, a method is proposed wherein the frictional material not containing metals such as a copper and a copper alloy while containing a magnesium oxide and a graphite with the content thereof being 45 to 80% by volume and with the ratio of the magnesium oxide to the graphite being in the range of 1/1 to 4/1 is used (see the Patent Document 2).

Patent Document 1: Japanese Patent Laid-Open Publication No. 2003-313312

Patent Document 2: Japanese Patent Laid-Open Publication No. 2002-138273

SUMMARY OF THE INVENTION

Problems to be Solved by the Invention

However, in the frictional materials having been developed so far which contain small amount of a copper and a copper alloy, it has been difficult to satisfy both the abrasion resistance at high temperature and suppression of generation of the metal catch at the same time.

Accordingly, the present invention has an object to provide; a non-asbestos frictional material composition capable of giving a frictional material having an excellent abrasion resistance at high temperature while generating less amount of the metal catch even if contents of a copper and a copper alloy are small; and further a frictional material and a friction member that use the said non-asbestos frictional material composition.

Means for Solving the Problem

Inventors of the present invention carried out an extensive investigation; and as a result, it was found that, in a non-asbestos frictional material composition, the foregoing problems could be solved when content of a copper therein was made below a certain value as a copper element, content of metal fibers therein other than a copper fiber and a copper alloy fiber was made below a certain value, a titanate salt was made to be contained therein in a certain amount, and antimony trisulfide or zinc powders were further made to be contained therein, and thereby completed the present invention.

That is, the present invention is as following.

1. A non-asbestos frictional material composition containing a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt and antimony trisulfide are contained therein with content of the titanate salt being in the range of 10 to 35% by mass.

2. A non-asbestos frictional material composition containing a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt and zinc powders are contained therein with content of the titanate salt being in the range of 10 to 35% by mass.

3. The non-asbestos frictional material composition according to 1 or 2, wherein the titanate salt is in the form of a scale, a plate, or a pillar.

4. The non-asbestos frictional material composition according to any of 1 to 3, wherein the titanate salt is a lithium potassium titanate or a magnesium potassium titanate.

5. The non-asbestos frictional material composition according to 1, wherein content of the antimony trisulfide is in the range of 1 to 10% by mass.

6. The non-asbestos frictional material composition according to 2, wherein content of the zinc powders is in the range of 1 to 10% by mass.

7. A frictional material formed by molding the non-asbestos frictional material composition according to any of 1 to 6.

8. A friction member formed by using a backing plate and the frictional material formed by molding the non-asbestos frictional material composition according to any of 1 to 6.

Effect of the Invention

When used for frictional materials such as a disc brake pad and a brake lining for a car, the non-asbestos frictional material composition of the present invention is environmentally benign due to low content of a copper in the abrasion powders generated during braking while it is excellent in the abrasion resistance at high temperature and effective to suppress generation of the metal catch. In addition, the use of the non-asbestos frictional material composition of the present invention can provide a frictional material and a friction member having the characteristics as mentioned above.

MODES FOR CARRYING OUT THE INVENTION

Hereinafter, details of the non-asbestos frictional material composition of the present invention, and the frictional material and the friction member that use this composition will be described.

1. Non-Asbestos Frictional Material Composition

A first embodiment of the present invention relates to a non-asbestos frictional material composition containing a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt and antimony trisulfide are contained therein with content of the titanate salt being in the range of 10 to 35% by mass.

A second embodiment of the present invention relates to a non-asbestos frictional material composition containing a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt and zinc powders are contained therein with content of the titanate salt being in the range of 10 to 35% by mass.

By the compositions as mentioned above, the effects such as, environmentally benign characteristics due to lower content of a copper in the abrasion powders generated during braking as compared with conventional products, excellent abrasion resistance at high temperature, and suppression of generation of the metal catch can be expressed.

Binder:

The binder bonds integrally an organic filler, an inorganic filler, a fiber substrate, and so forth contained in the frictional material composition to give a strength. As to the binder contained in the non-asbestos frictional material composition of the present invention, any binders can be used without any particular restriction; and thus, a thermosetting resin usually used as a binder of a frictional material may be used.

Illustrative example of the above-mentioned thermosetting resin includes a phenol resin; various elastomer-dispersed phenol resins such as an acrylic elastomer-dispersed phenol resin and a silicone elastomer-dispersed phenol resin; and various modified phenol resins such as an acryl-modified phenol resin, a silicone-modified phenol resin, a cashew-modified phenol resin, an epoxy-modified phenol resin, and an alkylbenzene-modified phenol resin. These can be used solely or as a combination of two or more kinds of them. In particular, a phenol resin, an acryl-modified phenol resin, a silicone-modified phenol resin, and an alkylbenzene-modified phenol resin are preferably used because these can afford excellent heat resistance, moldability, and friction coefficient.

Content of the binder in the non-asbestos frictional material composition of the present invention is preferably in the range of 5 to 20% by mass, or more preferably in the range of 5 to 10% by mass. By making the content of the binder in the range of 5 to 20% by mass, decrease in strength of the frictional material may be suppressed further; and in addition, deterioration of the sound vibration performance such as a squeal caused by decrease in porosity of the frictional material thereby leading to increase in the elastic modulus may be suppressed.

Organic Filler:

The organic filler is contained as a friction-controlling material to improve the sound vibration performance, the abrasion resistance, and the like of the frictional material. As to the organic filler to be contained in the non-asbestos frictional material composition of the present invention, there is no particularly restriction as far as it can express the performance as mentioned above; and thus, a cashew dust, a rubber component, and the like, which are usually used as the organic filler, may be used.

A cashew dust that is obtained by pulverizing a cured cashew nut shell oil and is used usually as the frictional material may be used.

Illustrative example of the rubber component includes a tire rubber, an acryl rubber, an isoprene rubber, NBR (nitrile-butadiene rubber), and SBR (styrene-butadiene rubber); and these may be used solely or as a combination of two or more kinds of them.

In addition, the cashew dust may be used concomitantly with the rubber component, or the cashew dust covered with the rubber component may be used; however, in view of the sound vibration performance, the concomitant use of the cashew dust with the rubber component is preferable.

Content of the organic filler in the non-asbestos frictional material composition of the present invention is preferably in the range of 1 to 20% by mass, more preferably in the range of 1 to 10% by mass, or still more preferably in the range of 3 to 8% by mass. By making the content of the organic filler in the range of 1 to 20% by mass, deterioration of the sound vibration performance such as a squeal caused by increase in the elastic modulus of the frictional material may be avoided; and in addition, deterioration of the heat resistance and decrease in the strength due to a thermal history may be avoided. In the case of the concomitant use of the cashew dust with the rubber component, the mass ratio of the cashew dust to the rubber component is preferably in the range of 2:1 to 10:1, more preferably in the range of 3:1 to 9:1, or still more preferably in the range of 3:1 to 8:1.

Inorganic Filler:

The non-asbestos frictional material compositions of the first and the second embodiments of the present invention contain a titanate salt as the inorganic filler to increase the abrasion resistance at high temperature and to suppress generation of the metal catch.

As to the titanate salt, a potassium titanate, a lithium potassium titanate, a magnesium potassium titanate, and the like may be used. Illustrative example of the potassium titanate includes $K_2O \cdot 6TiO_2$ and $K_2O \cdot 8TiO_2$. Illustrative example of the lithium potassium titanate includes a composition expressed by the formula $K_{0.3-0.7}Li_{0.27}Ti_{1.73}O_{3.8-3.95}$ obtained by mixing a titanium source, a lithium source, and a potassium source. Illustrative example of the magnesium potassium titanate includes a composition expressed by the formula $K_{0.2-07}Mg_{0.4}Ti_{1.6}O_{3.7-3.95}$ obtained by mixing a titanium source, a magnesium source, and a potassium source.

These may be used solely or as a combination of two or more kinds of them. Among them, in view of further enhancement of the abrasion resistance at high temperature, the lithium potassium titanate and the magnesium potassium titanate are preferable.

The titanate salt in the form of a fiber, a pillar, a plate, a particle, or a scale may be used; and these may be used solely or as a combination of two or more kinds of them.

Analysis of the titanate salt form may be made by observation with, for example, a scanning electron microscope (SEM).

Here, one definition as to the form of the titanate salt is shown below.

The form of the titanate salt is defined by an aspect ratio (L/T and L/B), provided that, in the cuboid having the smallest volume among cuboids which circumscribe the titanate salt (circumscribing cuboid), L is the long length of the longest side, B is the short length of the next longest side, and T is the thickness of the shortest side (B>T).

The titanate salt in the form of a fiber means the titanate salt whose L/T is more than 10, and L/B is more than 10. Illustrative example thereof includes TISMO D and TISMO N (both are manufactured by Otsuka Chemical Co., Ltd.).

The titanate salt in the form of a pillar means the titanate salt whose L/T is in the range of 2 to 10, and L/B is in the range of 2 to 10. Illustrative example thereof includes TOFIX-S (manufactured by Toho Material Co., Ltd.).

The titanate salt in the form of a plate means the titanate salt whose L/T is more than 10, and L/B is less than 10. Illustrative example thereof includes TXAX-A, TXAX-MA, TXAX-KA, and TXAX-CT (all are manufactured by Kubota Corp.).

The titanate salt in the form of a particle means the titanate salt whose L/T is less than 10, and L/B is less than 2. Illustrative example thereof includes TOFIX-SGL (manufactured by Toho Material Co., Ltd.) and GTX-C (manufactured by Kubota Corp.).

Among the titanate salts in the form of a particle, those having the form of a thin plate like a scale is called as the titanate salt in the form of a scale, and illustrative example thereof includes Terracess PS, Terracess PM, Terracess L, and Terracess TF-S (all are manufactured by Otsuka Chemical Co., Ltd.).

Among the forms mentioned above, the form of a scale, a pillar, or a plate is preferable in order to further enhance the abrasion resistance at high temperature.

In addition, those having the average particle diameter in the range of 1 to 50 µm and the specific surface area in the range of 0.5 to 10 $m^2/g$ are preferable. Meanwhile, the average particle diameter is expressed in terms of the median diameter, which is the 50%-diameter obtained from the volume distribution in the laser diffraction method. The specific surface area may be obtained by the BET method which uses a nitrogen gas as the adsorbent gas or by other method.

Content of the titanate salt in the non-asbestos frictional material composition of the present invention is in the range of 10 to 35% by mass, preferably in the range of 13 to 24% by mass, or more preferably in the range of 14 to 20% by mass, in order to enhance the abrasion resistance at high temperature and to suppress generation of the metal catch. If content of the titanate salt is less than 10% by mass, there are tendencies that the abrasion resistance deteriorates and the metal catch is generated easily. If the content thereof is more than 35% by mass, there are tendencies that the abrasion resistance deteriorates, the friction coefficient decreases, and the metal catch is generated easily.

According to the first embodiment of the non-asbestos frictional material composition of the present invention, antimony trisulfide is contained therein. Furthermore, in the second embodiment of the present invention, antimony trisulfide may be contained therein as necessary.

As to the antimony trisulfide, any of them may be used without any particular restriction as far as it is generally used as a friction-controlling material.

Content of the antimony trisulfide in the non-asbestos frictional material composition of the present invention is preferably in the range of 0.5 to 12% by mass, more preferably in the range of 1 to 10% by mass, still more preferably in the range of 1 to 6% by mass, or especially preferably in the range of 2 to 5% by mass. By making the content of the antimony trisulfide preferably in the range of 0.5 to 12% by mass, or more preferably in the range of 1 to 10% by mass, an excellent abrasion resistance may be obtained while generation of the metal catch may be avoided.

The non-asbestos frictional material composition of the present invention may further contain an inorganic filler other than the titanate salts and antimony trisulfide as mentioned above. As to the inorganic filler that can be used, there is no particular restriction as far as it is generally used in the frictional material.

Illustrative example of the inorganic filler includes stannous sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, cokes, graphite, mica, iron oxide, vermiculite, calcium sulfate, talc, clay, zeolite, zirconium silicate, zirconium oxide, mullite, chromite, titanium oxide, magnesium oxide, silica, iron oxide, and an active alumina such as γ-alumina. These may be used solely or as a combination of two or more kinds of them. Among them, in order to decrease the attacking property to the counter material, preferably graphite or barium sulfite is contained therein; and in view of enhancement of the friction coefficient, preferably zirconium oxide is contained therein.

Content of the inorganic filler in the non-asbestos frictional material composition of the present invention is preferably in the range of 30 to 80% by mass, more preferably in the range of 40 to 80% by mass, or still more preferably in the range of 60 to 80% by mass. By making the content of the inorganic filler in the range of 30 to 80% by mass, deterioration of the heat resistance may be avoided. Meanwhile, content of the inorganic filler includes content of the titanate salt and the antimony trisulfide as mentioned before.

Fiber Substrate:

The fiber substrate exhibits a reinforcing effect in the frictional material.

Illustrative example of the fiber substrate contained in the non-asbestos frictional material composition of the present invention includes an inorganic fiber, a metal fiber, an organic fiber, and a carbon fiber, which are generally used as the fiber substrate. These may be used solely or as a combination of two or more kinds of them. Meanwhile, the fiber substrate referred to herein does not include the foregoing titanate salts in the form of a fiber.

Illustrative example of the usable inorganic fiber includes a ceramic fiber, a biodegradable ceramic fiber, a mineral fiber, a glass fiber, and a silicate fiber; and these may be used solely or as a combination of two or more kinds of them.

Meanwhile, the mineral fiber referred to herein is an artificial inorganic fiber obtained by melt-spinning of blast furnace slag for a slag wool, basalt for a basalt fiber, or other natural stone as the main component. Specifically, the mineral fiber containing $SiO_2$, $Al_2O_3$, CaO, MgO, FeO, $Na_2O$, or the like, solely or in a combination of two or more kinds of them, may be used. Among them, more preferably a natural mineral containing an Al element may be used as the mineral fiber.

As the average fiber length of the entire mineral fibers contained in the frictional material composition increases, the adhesion strength thereof with each component in the frictional material composition tends to decrease; and thus, the average fiber length of the entire mineral fibers is preferably 500 μm or less, or more preferably in the range of 100 to 400 μm. The average fiber length referred to herein means the number-average fiber length showing the average value of length of the entire fibers pertinent thereto. For example, the average fiber length of 200 μm means that the average value is 200 μm when the fiber lengths of randomly selected 50 mineral fibers used as the raw material for the frictional material composition are measured with an optical microscope.

The mineral fiber used in the present invention is preferably soluble in a living body in considering a harmful effect thereof to the human body. The mineral fiber soluble in a living body that is referred herein means the mineral fiber having the feature to be partially degraded in a short period of time and discharged outside the body even if ingested into the human body. Specifically, this means that the chemical composition thereof contains 18% or more by mass as the total amount of alkali oxides and alkaline earth oxides (total amount of oxides of sodium, potassium, calcium, magnesium, and barium), and that the fiber satisfies any of the following conditions: the short-term biological continuous test by aspiration of the fiber having the length of 20 μm or more shows 40 or less days as the half-life in terms of the mass thereof; the intraperitoneal test shows no evidence for excessive carcinogenicity; and the long-term aspiration test shows no associated pathogenicity or tumorigenesis (Nota Q of EU directive 97/69/EC (exempted from the carcinogenic classification)). Illustrative example of the biodegradable mineral fiber like this includes a $SiO_2$—$Al_2O_3$—CaO—MgO—FeO—$Na_2O$ fiber, and a fiber containing $SiO_2$, $Al_2O_3$, CaO, MgO, FeO, and $Na_2O$ in any combination of them. Illustrative example of the commercially available product thereof includes a series of the Roxul fibers (manufactured by LAPINUS FIBRES B.V.) "The Roxul" contains $SiO_2$, $Al_2O_3$, CaO, MgO, FeO, $Na_2O$, and so forth.

As to the metal fiber, in order to enhance the crack resistance and the abrasion resistance, a copper fiber or a copper alloy fiber may be used. However, if a copper fiber or a copper alloy fiber is used, in view of the environmental care, total content of the copper in the frictional material composition needs to be 5% or less by mass as a copper element.

Illustrative example of the copper fiber and the copper alloy fiber includes a copper fiber, a brass fiber, and a bronze fiber; and these may be used solely or as a combination of two or more kinds of them.

Alternatively, as to the metal fiber, in view of the crack resistance and enhancement of the friction coefficient, a metal fiber other than the copper fiber and the copper alloy fiber may be used; however, in this case, the content thereof needs to be 0.5% or less by mass in order to enhance the abrasion resistance and to suppress generation of the metal catch. Preferably, the metal fiber other than the copper fiber and the copper alloy fiber is not contained therein (content of 0% by mass) because the benefit due to enhancement of the friction coefficient cannot compensate the demerits due to deterioration of the abrasion resistance and generation of the metal catch, both of which occur easily.

Illustrative example of the metal fiber other than the copper fiber or the copper alloy fiber includes fibers of a metal single body or of a metal alloy of aluminum, iron, zinc, tin, titanium, nickel, magnesium, silicon, and a fiber containing a metal such as a cast iron as the main component, wherein these may be used solely or as a combination of two or more kinds of them.

As to the organic fiber, an aramid fiber, a cellulose fiber, an acryl fiber, a phenol resin fiber (having a cross-linked structure), and so forth may be used. These can be used solely or as a combination of two or more kinds of them; and in view of the abrasion resistance, an aramid fiber is preferably used.

As to the carbon fiber, a flame-retardant fiber, a pitch-based carbon fiber, a polyacrylonitrile (PAN) carbon fiber, an active carbon fiber, and so forth may be used. These may be used solely or as a combination of two or more kinds of them.

Content of the fiber substrate in the non-asbestos frictional material composition of the present invention is preferably in the range of 5 to 40% by mass, more preferably in the range of 5 to 20% by mass, or still more preferably in the range of 5 to 18% by mass. By making the content of the fiber substrate in the range of 5 to 40% by mass, an optimal porosity as the frictional material may be obtained, a squeal may be prevented from occurring, an adequate material strength may be obtained, the abrasion resistance may be expressed, and a good moldability may be obtained. Meanwhile, the above-mentioned content of the fiber substrate includes content of the metal fiber of a copper fiber or a copper alloy fiber.

Zinc Powder:

The second embodiment of the non-asbestos frictional material composition of the present invention contains zinc powders. The first embodiment of the present invention may also contain zinc powders as necessary.

Content of the zinc powders in the non-asbestos frictional material composition of the present invention is preferably in the range of 0.2 to 15% by mass, more preferably in the range of 1 to 10% by mass, still more preferably in the range of 1 to 6% by mass, or especially preferably in the range of 2 to 5% by mass. By making the content of the zinc powders preferably in the range of 0.2 to 15% by mass, or more preferably in the range of 1 to 10% by mass, an excellent abrasion resistance may be obtained.

The average particle diameter of the zinc powders is, in view of the abrasion resistance, preferably in the range of 0.1 to 150 μm, more preferably in the range of 0.1 to 100 μm, still more preferably in the range of 0.1 to 50 μm, or especially preferably in the range of 10 to 45 μm.

Other Materials:

The non-asbestos frictional material composition of the present invention may be blended with, in addition to the binder, the organic filler, the inorganic filler, the fiber substrate, the zinc powders—all of which were mentioned above—, and as necessary, other materials.

For example, powders of copper metals such as copper powders, brass powders, and bronze powders may be blended such that the total copper content based on the non-asbestos frictional material composition of the present invention may be in the range of 5% or less by mass as a copper element. In addition, in view of the abrasion resistance, an organic additive and the like including a fluorinated polymer such as PTFE (polytetrafluoroethylene) may be blended therein.

2. Frictional Material and Friction Member

The present invention also provides a frictional material and a friction member that use the above-mentioned non-asbestos frictional material composition.

The non-asbestos frictional material composition of the present invention can be molded for the use as frictional materials such as a disc brake pad and a brake lining for a car. The frictional material of the present invention has an excellent abrasion resistance at high temperature and can suppress generation of the metal catch efficiently; and thus, this frictional material is suitable for a disc brake pad that receives a large load during braking.

By using the above-mentioned frictional material, a friction member having the frictional material formed as the frictional surface thereof can be obtained. The friction member formable by using the frictional material includes, for example, the following structures.

(1): Structure having only the frictional material
(2): Structure having the backing plate and the frictional material—comprising the non-asbestos frictional material composition of the present invention—formed on the backing plate so as to become the frictional surface.
(3): In the structure (2), structure having, between the backing plate and the frictional material, a primer layer to modify the surface of the backing plate thereby enhancing the adhesive effect thereof, and in addition, an adhesive layer to adhere the backing plate with the frictional material.

The foregoing backing plate is usually used for a friction member to improve the mechanical strength of the friction member; and as for the material thereof, a metal, a fiber-reinforced plastic, or the like may be used. Illustrative example of the material includes an iron, a stainless steel, an inorganic fiber-reinforced plastic, and a carbon fiber-reinforced plastic. As for the primer layer and the adhesive layer, any material usually used for a friction member such as a brake shoe may be used.

The frictional material of the present invention may be produced by using a generally used method; and therefore, the said frictional material may be produced by molding the non-asbestos frictional material composition of the present invention preferably by a hot press-molding method.

Specifically, the non-asbestos frictional material composition of the present invention is uniformly mixed by using a mixer such as a Loedige mixer, a pressure kneader, and an Eirich intensive mixer; the resulting mixture is pre-molded in a mold; the obtained pre-molded article is molded under the conditions of a molding temperature of 130 to 160° C. and a molding pressure of 20 to 50 MPa for the period of 2 to 10 minutes; the obtained molded article is heated at 150 to 250° C. for 2 to 10 hours; and then, this heat-treated article is coated, scorched, or polished, as necessary, to obtain the frictional material.

The non-asbestos frictional material composition of the present invention exhibits excellent effects in the abrasion resistance at high temperature, suppression of generating the metal catch, and so forth; and thus, this is useful as the "over layer" of friction members such as a disc brake pad and a brake lining, and in addition, this may be molded so as to be used as the "under layer" of the friction member.

Note here that, the "over layer" is the frictional material formed so as to become the frictional surface of the friction member; and the "under layer" is a layer placed between the frictional material formed so as to become the frictional surface of the friction member and the backing plate in order to improve the shear strength and the anti-crack properties around the bonded part between the frictional material and the backing plate.

EXAMPLES

The present invention will be explained in more detail by referring to Examples; but the present invention is not restricted at all by these Examples.

Evaluations shown in Examples and Comparative Examples were conducted as follows.

(1) Evaluation of Abrasion Resistance at High Temperature

Abrasion resistance of the frictional material was calculated as the abrasion amount from the thicknesses of the frictional material before and after the braking test of 1000 times under the conditions of 500° C. as the temperature before braking, 60 km/hour as the speed before braking, and 0.3 G as the deceleration.

(2) Evaluation of Metal Catch Generation

In evaluation of generation of the metal catch, total 36 times of braking were carried out while the temperature before braking was ascended from 50° C. to 300° C. with the interval of 50° C., wherein at each temperature the braking was done two times for each of the braking conditions of 1.96 m/s$^2$, 2.94 m/s$^2$, and 3.92 m/s$^2$, at 60 km/hour as the speed before braking; then, total 30 times of braking were carried out while the temperature was descended from 250° C. to 50° C. with the interval of 50° C. under the same conditions as those of the ascending temperature case. After the test, the size and the number of the metal catch formed on the sliding surface of the frictional material were evaluated by the following criteria.

A: There is no metal catch formed.

B: 1 to 2 metal catches with the size of less than 2 mm as the long length are formed.

C 3 or more metal catches with the size of less than 2 mm as the long length are formed.

D: One or more metal catches with the size of 2 mm or more as the long length are formed.

(3) Evaluation of Friction Coefficient

The friction coefficient was measured based on Japanese Automotive Standards Organization JASO C406; and the average value of friction coefficients measured in the second effectiveness test was calculated.

The abrasion resistance, generation of the metal catch, and the friction coefficient mentioned above were evaluated by using a dynamometer with an inertia of 7 kgf·m·s$^2$. For these evaluations, a ventilated disc rotor (material of construction: FC190, manufactured by KIRIU Corporation) and a general pin sliding collet type caliper were used.

Examples 1 to 24 and Comparative Examples 1 to 10

Fabrication of Disc Brake Pad

The materials were blended according to the blending ratios shown in Table 1 and Table 2 to obtain the frictional material compositions of Examples and Comparative Examples.

Meanwhile, the unit of the blending amount of each component shown in Table 1 and Table 2 is in terms of % by mass in the frictional material composition.

The frictional material composition was mixed by using a Loedige mixer, Loedige Mixer M20 (trade name, manufactured by MATSUBO Corporation); and the resulting mixture was pre-molded by using a press molding machine (manufactured by OJI KIKAI CO., LTD). The obtained pre-molded article was hot pressed together with a backing plate (manufactured by Hitachi Automotive Systems, Ltd.) by using a hot-press molding machine (manufactured by SANKI SEIKO CO., LTD.) under the conditions of 145° C. as the molding temperature, 30 MPa as the molding pressure, and 5 minutes as the molding time. The obtained molded article was heated at 200° C. for 4.5 hours, polished with a rotary polisher, and then scorched at 500° C. to obtain the disc brake pad (thickness of the frictional material: 11 mm, and projected area of the frictional material: 52 cm$^2$).

The evaluation results for the fabricated disc brake pads are shown in Table 1 and Table 2.

Meanwhile, the materials used in respective Examples and Comparative Examples are as follows.

Binder:
  Phenol resin: HP491UP (trade name, manufactured by Hitachi Chemical Co., Ltd.)
Organic Filler:
  Cashew dust: FF-1090 (trade name, manufactured by Tohoku Chemical Industries, Ltd.)
Inorganic fillers:
  Titanate salt 1: Terracess L (trade name of the product containing the lithium potassium titanate ingredient having the form of a scale, the median diameter of 25 μm, and the specific surface area of 0.6 m$^2$/g; manufactured by Otsuka Chemical Co., Ltd.)
  Titanate salt 2: Terracess PS (trade name of the product containing the magnesium potassium titanate ingredient having the form of a scale, the median diameter of 4 μm, and the specific surface area of 2.5 m$^2$/g; manufactured by Otsuka Chemical Co., Ltd.)
  Titanate salt 3: Terracess TF-S (trade name of the product containing the potassium titanate ingredient having the form of a scale, the median diameter of 7 μm, and the specific surface area of 3.5 m$^2$/g; manufactured by Otsuka Chemical Co., Ltd.)
  Titanate salt 4: TXAX-MA (trade name of the product containing the potassium titanate ingredient having the form of a plate and the specific surface area of 1.5 m$^2$/g; manufactured by Kubota Corp.)
  Titanate salt 5: TOFIX-S (trade name of the product containing the potassium titanate ingredient having the form of a pillar, the median diameter of 6 μm, and the specific surface area of 0.9 m$^2$/g; manufactured by Toho Material Co., Ltd.)
  Titanate salt 6: TISMO D (trade name of the product containing the potassium titanate ingredient having the form of a fiber and the specific surface area of 7.0 m$^2$/g; manufactured by Otsuka Chemical Co., Ltd.)
  Barium sulfate: BA (trade name, manufactured by Sakai Chemical Industry Co., Ltd.)
  Graphite: KS75 (trade name, manufactured by TIMCAL Ltd.)
  Antimony trisulfide: P3 (trade name, manufactured by Nihon Seiko Co., Ltd.)
  Stannous sulfide: Stannolube (trade name, manufactured by Chemetall GmbH)
Fiber Substrate:
  Aramid fiber (organic fiber): 1F538 (trade name, manufactured by Du Pont-Toray Co., Ltd.)
  Iron fiber (metal fiber): #0 (trade name, manufactured by Global Material Technologies (GMT), Inc.)
  Copper fiber (metal fiber): SCA-1070 (trade name, manufactured by Sunny Metal, Inc.)
  Mineral fiber (inorganic fiber): RB240 Roxul 1000 (trade name of the product having the average fiber length of 300 μm; manufactured by Lapinus Fibers B.V.)
Zinc Powder:
  Zinc powder: Zn—At-200 (trade name of the product having the average particle diameter of 25 to 38 μm, manufactured by Fukuda Metal Foil & Powder Co., Ltd.)

TABLE 1

| | | Examples | | | | | | | | | | | | Comparative Examples | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 | 5 |
| Binder | Phenol resin | 8 | 8 | 8 | 8 | 8 | 8 | 8 | 8 | 8 | 8 | 8 | 8 | 8 | 8 | 8 | 8 | 8 |
| Organic filler | Cashew dust | 6 | 6 | 6 | 6 | 6 | 6 | 6 | 6 | 6 | 6 | 6 | 6 | 6 | 6 | 6 | 6 | 6 |
| | SBR powders | 1 | 1 | 1 | 1 | 1 | 1 | 1 | 1 | 1 | 1 | 1 | 1 | 1 | 1 | 1 | 1 | 1 |
| Inorganic filler | Titanate salt 1 | 15 | 0 | 10 | 0 | 0 | 0 | 0 | 12 | 25 | 15 | 15 | 15 | 15 | 15 | 5 | 40 | 15 |
| | Titanate salt 2 | 0 | 15 | 5 | 0 | 0 | 0 | 0 | 0 | 0 | 0 | 0 | 0 | 0 | 0 | 0 | 0 | 0 |
| | Titanate salt 3 | 0 | 0 | 0 | 15 | 0 | 0 | 0 | 0 | 0 | 0 | 0 | 0 | 0 | 0 | 0 | 0 | 0 |
| | Titanate salt 4 | 0 | 0 | 0 | 0 | 15 | 0 | 0 | 0 | 0 | 0 | 0 | 0 | 0 | 0 | 0 | 0 | 0 |
| | Titanate salt 5 | 0 | 0 | 0 | 0 | 0 | 15 | 0 | 0 | 0 | 0 | 0 | 0 | 0 | 0 | 0 | 0 | 0 |
| | Titanate salt 6 | 0 | 0 | 0 | 0 | 0 | 0 | 15 | 0 | 0 | 0 | 0 | 0 | 0 | 0 | 0 | 0 | 0 |
| | Barium sulfate | 31 | 31 | 31 | 31 | 31 | 31 | 31 | 34 | 21 | 35 | 35.5 | 24 | 36 | 40 | 41 | 6 | 30 |
| | Graphite | 5 | 5 | 5 | 5 | 5 | 5 | 5 | 5 | 5 | 5 | 5 | 5 | 5 | 5 | 5 | 5 | 5 |
| | Antimony trisulfide | 5 | 5 | 5 | 5 | 5 | 5 | 5 | 5 | 5 | 5 | 0.5 | 12 | 0 | 0 | 5 | 5 | 5 |
| | Calcium hydroxide | 5 | 5 | 5 | 5 | 5 | 5 | 5 | 5 | 5 | 5 | 5 | 5 | 5 | 5 | 5 | 5 | 5 |
| | Zirconium oxide | 10 | 10 | 10 | 10 | 10 | 10 | 10 | 10 | 10 | 10 | 10 | 10 | 10 | 10 | 10 | 10 | 10 |
| Fiber substrate | Aramid fiber | 5 | 5 | 5 | 5 | 5 | 5 | 5 | 5 | 5 | 5 | 5 | 5 | 5 | 5 | 5 | 5 | 5 |
| | Iron fiber | 0 | 0 | 0 | 0 | 0 | 0 | 0 | 0 | 0 | 0 | 0 | 0 | 0 | 0 | 0 | 0 | 1 |
| | Copper fiber | 4 | 4 | 4 | 4 | 4 | 4 | 4 | 4 | 4 | 0 | 4 | 4 | 4 | 0 | 4 | 4 | 4 |
| | Mineral fiber | 5 | 5 | 5 | 5 | 5 | 5 | 5 | 5 | 5 | 5 | 5 | 5 | 5 | 5 | 5 | 5 | 5 |

TABLE 1-continued

|  | Examples | | | | | | | | | | | | Comparative Examples | | | | |
| --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 1 | 2 | 3 | 4 | 5 |
| Copper content as copper element (% by mass) | 4 | 4 | 4 | 4 | 4 | 4 | 4 | 4 | 4 | 0 | 4 | 4 | 4 | 0 | 4 | 4 | 4 |
| Metal fiber (iron fiber) content other than copper fiber and copper alloy fiber (% by mass) | 0 | 0 | 0 | 0 | 0 | 0 | 0 | 0 | 0 | 0 | 0 | 0 | 0 | 0 | 0 | 0 | 1 |
| Abrasion amount of frictional material at 500° C. (mm) | 1.3 | 1.4 | 1.4 | 1.8 | 1.7 | 1.9 | 2.2 | 2.0 | 1.7 | 1.7 | 2.8 | 2.6 | 2.8 | 4.8 | 2.7 | 2.7 | 3.3 |
| Generation of metal catch | A | A | A | B | A | A | B | B | B | B | B | B | C | D | C | C | D |
| Friction coefficient | 0.38 | 0.40 | 0.40 | 0.40 | 0.41 | 0.40 | 0.40 | 0.40 | 0.40 | 0.43 | 0.40 | 0.41 | 0.39 | 0.39 | 0.40 | 0.35 | 0.43 |

TABLE 2

| | | Examples | | | | | | | | | | | | Comparative Examples | | | | |
| --- | --- | --- | --- | --- | --- | --- | --- | --- | --- | --- | --- | --- | --- | --- | --- | --- | --- | --- |
| | | 13 | 14 | 15 | 16 | 17 | 18 | 19 | 20 | 21 | 22 | 23 | 24 | 6 | 7 | 8 | 9 | 10 |
| Binder | Phenol resin | 8 | 8 | 8 | 8 | 8 | 8 | 8 | 8 | 8 | 8 | 8 | 8 | 8 | 8 | 8 | 8 | 8 |
| Organic filler | Cashew dust | 6 | 6 | 6 | 6 | 6 | 6 | 6 | 6 | 6 | 6 | 6 | 6 | 6 | 6 | 6 | 6 | 6 |
| | SBR powders | 1 | 1 | 1 | 1 | 1 | 1 | 1 | 1 | 1 | 1 | 1 | 1 | 1 | 1 | 1 | 1 | 1 |
| Inorganic filler | Titanate salt 1 | 15 | 0 | 10 | 0 | 0 | 0 | 0 | 12 | 25 | 15 | 15 | 15 | 15 | 15 | 5 | 40 | 15 |
| | Titanate salt 2 | 0 | 15 | 5 | 0 | 0 | 0 | 0 | 0 | 0 | 0 | 0 | 0 | 0 | 0 | 0 | 0 | 0 |
| | Titanate salt 3 | 0 | 0 | 0 | 15 | 0 | 0 | 0 | 0 | 0 | 0 | 0 | 0 | 0 | 0 | 0 | 0 | 0 |
| | Titanate salt 4 | 0 | 0 | 0 | 0 | 15 | 0 | 0 | 0 | 0 | 0 | 0 | 0 | 0 | 0 | 0 | 0 | 0 |
| | Titanate salt 5 | 0 | 0 | 0 | 0 | 0 | 15 | 0 | 0 | 0 | 0 | 0 | 0 | 0 | 0 | 0 | 0 | 0 |
| | Titanate salt 6 | 0 | 0 | 0 | 0 | 0 | 0 | 15 | 0 | 0 | 0 | 0 | 0 | 0 | 0 | 0 | 0 | 0 |
| | Barium sulfate | 28 | 28 | 28 | 28 | 28 | 28 | 28 | 31 | 18 | 32 | 32.5 | 21 | 33 | 37 | 38 | 3 | 27 |
| | Graphite | 5 | 5 | 5 | 5 | 5 | 5 | 5 | 5 | 5 | 5 | 5 | 5 | 5 | 5 | 5 | 5 | 5 |
| | Stannous sulfide | 3 | 3 | 3 | 3 | 3 | 3 | 3 | 3 | 3 | 3 | 3 | 3 | 3 | 3 | 3 | 3 | 3 |
| | Calcium hydroxide | 5 | 5 | 5 | 5 | 5 | 5 | 5 | 5 | 5 | 5 | 5 | 5 | 5 | 5 | 5 | 5 | 5 |
| | Zirconium oxide | 10 | 10 | 10 | 10 | 10 | 10 | 10 | 10 | 10 | 10 | 10 | 10 | 10 | 10 | 10 | 10 | 10 |
| Fiber substrate | Aramid fiber | 5 | 5 | 5 | 5 | 5 | 5 | 5 | 5 | 5 | 5 | 5 | 5 | 5 | 5 | 5 | 5 | 5 |
| | Iron fiber | 0 | 0 | 0 | 0 | 0 | 0 | 0 | 0 | 0 | 0 | 0 | 0 | 0 | 0 | 0 | 0 | 1 |
| | Copper fiber | 4 | 4 | 4 | 4 | 4 | 4 | 4 | 4 | 4 | 0 | 4 | 4 | 4 | 0 | 4 | 4 | 4 |
| | Mineral fiber | 5 | 5 | 5 | 5 | 5 | 5 | 5 | 5 | 5 | 5 | 5 | 5 | 5 | 5 | 5 | 5 | 5 |
| Zinc powders | | 5 | 5 | 5 | 5 | 5 | 5 | 5 | 5 | 5 | 5 | 0.5 | 12 | 0 | 0 | 5 | 5 | 5 |
| Copper content as copper element (% by mass) | | 4 | 4 | 4 | 4 | 4 | 4 | 4 | 4 | 4 | 0 | 4 | 4 | 4 | 0 | 4 | 4 | 4 |
| Metal fiber (iron fiber) content other than copper fiber and copper alloy fiber (% by mass) | | 0 | 0 | 0 | 0 | 0 | 0 | 0 | 0 | 0 | 0 | 0 | 0 | 0 | 0 | 0 | 0 | 1 |
| Abrasion amount of frictional material at 500° C. (mm) | | 1.5 | 1.4 | 1.6 | 1.8 | 1.8 | 1.7 | 2.0 | 1.8 | 1.9 | 2.0 | 2.5 | 3.0 | 3.2 | 5.8 | 2.9 | 2.3 | 4.0 |
| Generation of metal catch | | A | A | A | A | A | A | B | B | B | B | B | B | C | D | D | C | D |
| Friction coefficient | | 0.39 | 0.42 | 0.40 | 0.40 | 0.41 | 0.40 | 0.40 | 0.40 | 0.39 | 0.39 | 0.40 | 0.40 | 0.40 | 0.40 | 0.39 | 0.41 | 0.43 |

In Examples 1 to 12, the abrasion amount of the frictional material at 500° C. was small, thereby showing an excellent abrasion resistance while suppressing generation of the metal catch and expressing a high friction coefficient. On the other hand, neither the satisfactory abrasion resistance could be obtained nor generation of the metal catch could be suppressed in Comparative Examples 1 and 2 in which antimony trisulfide was not contained, in Comparative Example 3 in which content of the titanate salt was less than 10% by mass, in Comparative Example 4 in which content of the titanate salt was more than 35% by mass, and in Comparative Example 5 in which the iron fiber was contained with the amount of 1% by mass.

In Examples 13 to 24, the abrasion amount of the frictional material at 500° C.' was small, thereby showing an excellent abrasion resistance while suppressing generation of the metal catch and expressing a high friction coefficient. On the other hand, neither the satisfactory abrasion resistance could be obtained nor generation of the metal catch could be suppressed in Comparative Examples 6 and 7 in which zinc powders were not contained, in Comparative Example 8 in which content of the titanate salt was less than 10% by mass, in Comparative Example 9 in which content of the titanate salt was more than 35% by mass, and in Comparative Example 10 in which the iron fiber was contained with the amount of 1% by mass.

INDUSTRIAL APPLICABILITY

When compared with conventional materials, the non-asbestos frictional material composition of the present invention is environmentally benign due to low content of a copper in abrasion powders generated during braking and is excellent in the abrasion resistance at high temperature, and in addition, it can suppress generation of the metal catch; and thus, this is useful for frictional materials and friction members, such as a disc brake pad and a brake lining for a car.

The invention claimed is:

1. A non-asbestos frictional material composition comprising a binder, an organic filler, an inorganic filler, and a fiber substrate, wherein, in the non-asbestos frictional material composition, content of a copper is 5% or less by mass as a copper element, content of a metal fiber other than a copper fiber and a copper alloy fiber is 0.5% or less by mass, and a titanate salt and antimony trisulfide are comprised therein with content of the titanate salt being in the range of 13 to 35% by mass.

2. The non-asbestos frictional material composition according to claim 1, wherein content of the antimony trisulfide is in the range of 1 to 10% by mass.

3. The non-asbestos frictional material composition according to claim 1, wherein the titanate salt is in the form of a scale, a plate, or a pillar.

4. The non-asbestos frictional material composition according to claim 1, wherein the titanate salt is a lithium potassium titanate or a magnesium potassium titanate.

5. A frictional material formed by molding the non-asbestos frictional material composition according to claim 1.

6. A friction member formed by using a backing plate and the frictional material formed by molding the non-asbestos frictional material composition according to claim 1.

7. The non-asbestos frictional material composition according to claim 1, wherein content of the titanate salt being in the range of 13 to 24% by mass.

8. A frictional material formed by molding the non-asbestos frictional material composition according to claim 7.

9. A friction member formed by using a backing plate and the frictional material formed by molding the non-asbestos frictional material composition according to claim 7.

10. The non-asbestos frictional material composition according to claim 1, wherein content of the titanate salt being in the range of 14 to 20% by mass.

* * * * *